(12) United States Patent
Rashidi et al.

(10) Patent No.: US 8,543,716 B1
(45) Date of Patent: Sep. 24, 2013

(54) METHOD AND SYSTEM ENABLING A FIRST COMPUTING DEVICE TO INSTRUCT A SECOND COMPUTING DEVICE TO DISPLAY DATA

(71) Applicant: FMR LLC, Boston, MA (US)

(72) Inventors: Paul Rashidi, Dublin, CA (US); Jeanne Mackin, Braintree, MA (US); Mark Kelly, Dallas, TX (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 13/675,914

(22) Filed: Nov. 13, 2012

Related U.S. Application Data (63) Continuation of application No. 13/623,702, filed on Sep. 20, 2012, now abandoned.

(51) Int. Cl.
*G06F 15/16* (2006.01)
*G06F 21/00* (2013.01)
*G06F 17/30* (2006.01)

(52) U.S. Cl.
USPC ............. 709/229; 709/226; 713/182; 726/27

(58) Field of Classification Search
USPC ................ 709/204–207, 227–229; 726/2–6, 726/26–33; 713/150–186; 705/64–76, 904
See application file for complete search history.

(56) References Cited

U.S. PATENT DOCUMENTS

| | | | |
|---|---|---|---|
| 2002/0136167 A1* | 9/2002 | Steele et al. | 370/260 |
| 2005/0015601 A1* | 1/2005 | Tabi | 713/182 |
| 2005/0086298 A1* | 4/2005 | Campbell et al. | 709/203 |
| 2006/0072144 A1* | 4/2006 | Dowling et al. | 358/1.15 |
| 2006/0259957 A1* | 11/2006 | Tam et al. | 726/3 |
| 2007/0160070 A1* | 7/2007 | Buchhop et al. | 370/401 |
| 2007/0192487 A1* | 8/2007 | Jakobson | 709/225 |
| 2010/0030790 A1* | 2/2010 | Fukuda et al. | 707/10 |
| 2010/0306392 A1* | 12/2010 | Fell et al. | 709/228 |
| 2011/0004649 A1* | 1/2011 | Nord et al. | 709/202 |
| 2011/0173683 A1* | 7/2011 | Roach | 726/4 |
| 2012/0311096 A1* | 12/2012 | Hurley et al. | 709/219 |

FOREIGN PATENT DOCUMENTS

KR       2002060374 A   *   7/2002

* cited by examiner

*Primary Examiner* — Brendan Higa
(74) *Attorney, Agent, or Firm* — Proskauer Rose LLP (57) ABSTRACT

A computer-implemented method of directing data from a first computing device to a second computing device is provided. The second computing device opens communication with a server. The server provides a unique identifier to the second computing device, and the second computing device remains available to received data. The first computing device transmits a request for data to be displayed to the server. The server (or a third device) transmits the data to be displayed to the second computing device. Once the data is displayed and/or acknowledged, the second computing device ceases to display the data and disconnects from the server.

11 Claims, 10 Drawing Sheets

METHOD AND SYSTEM ENABLING A FIRST COMPUTING DEVICE TO INSTRUCT A SECOND COMPUTING DEVICE TO DISPLAY DATA

RELATED APPLICATION

This application is a continuation of U.S. patent application Ser. No. 13/623,702, filed on Sep. 20, 2012, which is owned by the assignee of the instant application and the disclosure of which is incorporated herein by reference in it entirety.

FIELD OF THE INVENTION

The invention relates generally to a method and system for enabling a first computing device to provide data to a second computing device such that the data is displayed on the second computing device.

BACKGROUND

Many businesses transactions require acknowledgement data to be displayed on a viewer (e.g., customer or client). In one common situation, a business needs to display data (e.g., in the form of documents) to a customer but only for a limited duration. In another common situation, a business needs to display data to a customer but only for the time needed for the customer to acknowledge the data (e.g., by the customer signing a document). Current methods for displaying data for acknowledgement (i.e., view and/or signing) can require a customer travel to a business location (e.g., a branch), view the data on a hard paper copy or on a computer screen, and if necessary, sign the hard paper copy of the document. If signing is required, the signed document is scanned typically using a scanner into data storage used by the business. These methods of displaying data and/or obtaining acknowledgments can be problematic for several reasons.

Manual processes for printing and exchanging paper, then collecting a signature, assembling the paper to be later scanned, and delivered manually can cause administrative overhead and an overall delay in processing. Displaying data to a customer at a branch location can be problematic, because the customer may need to view the data prior to visiting the branch. Also, the displayed data may be large or otherwise unsuitable for easy viewing as a paper printout (e.g., a large table). If an agent attempts to show the data to the customer on her computer, which is typically connected to the business'internal computing network, the customer could gain access to data that the company prefers to keep private. Another problem with current methods is that when a hard copy paper document is signed by a client, there may be document and/or scanning errors that go undetected, requiring that the customer travel back to the business location a second time. As a result, the customer can be inconvenienced.

Other known methods for displaying data to a customer to obtain acknowledgment involve using tethered devices. For example, during check-out at a grocery store, a small screen is typically provided to a credit card user so that the customer can electronically sign for the credit charge. The small screen is tethered to a cash register. These devices are insufficient in situations involving customer viewing of a large amount of data, and require the customer to travel to the branch location. Further, tethered devices require a physical connection to the computer from which the data is originating. Physically connecting computing devices to tethered displays can be time consuming, costly and impractical. Further, tethered devices do not allow for viewing and/or acknowledgment at a location beyond the distance of the physical wiring. Additionally, these proprietary technical solutions can limit rapid scaling of a solution and can greatly limit the solution from taking advantage of advances in technology.

Therefore, it is desirable to display data for acknowledgement at a location that can be remote from a device that is requesting the data be displayed. It is also desirable to display data for acknowledgment purposes that prevents the customer from accessing any internal systems of the business. It is also desirable to display data for acknowledgment on a screen that is large enough and/or has the capability for the customer to read easily a large amount of data. It is also desirable to display data for acknowledgment without having to add computer hardware to connect devices.

SUMMARY OF THE INVENTION

In one aspect, the invention involves a computer-implemented method of directing data from a first computing device to a second computing device for display on the second computing device. The method also involves receiving, by a server, a request from the second computing device to open communication between the server and the second computing device. The method also involves verifying, by the server, that the second computing device is authorized to communicate with the server based on an identifier of the second computing device transmitted with the request. The method also involves assigning, by the server, a unique identifier to the second computing device. The method also involves transmitting, by the server, the unique identifier to the second computing device. The method also involves receiving, by the server, a request from the first computing device to direct data to the second computing device. The method also involves transmitting, by the server, to the second computing device an indicator that data to be received by the second computing device is the data to be displayed. The method also involves receiving, by the server, an end communication indicator from the second computing device. The method also involves disconnecting from the second computing device such that communication ends between the server and the second computing device.

In some embodiments, the unique identifier is based on the location the request was transmitted from, a customer the request was transmitted from, unique identifiers previously assigned to other devices by the server, or any combination thereof. In some embodiments, the method involves disconnecting, by the server, from the second computing device if the time between opening communication with the second computing device and receiving a request from the first computing device exceeds a predetermined threshold.

In some embodiments, the method involves a third device receiving a request from the server to transmit the data received by the second computing device to the second computing device. In some embodiments, the server transmits the data received by the second computing device to the second computing device.

In some embodiments, the first computing device is a tablet device, a desktop computing device, a cell phone device, a smart phone device, or a laptop device. In some embodiments, the second computing device is a tablet device, a desktop computing device, a cell phone device, a smart phone device, or a laptop device. In some embodiments, the second computing device includes a touch screen display.

In some embodiments, the end communication indicator is transmitted once an input is received on a touch screen display of the second computing device, once a button is pressed on the second computing device, or any combination thereof. In some embodiments, the first computing device, the server, and the second computing device communicate via wireless technology. In some embodiments, the data is a document, a web page, a graphic, a form, or any combination thereof. In some embodiments, the request from the second computing device includes an IP address of the second computing device.

In another aspect, the invention includes a computer program product, tangibly embodied in a non-transitory machine-readable storage device, for directing data from a first computing device to a second computing device for display on the second computing device. The computer program product includes instructions being operable to cause data processing apparatus to receive a request from the second computing device to open communication between a server and the second computing device. The computer program product also includes instructions being operable to cause data processing apparatus to verify that the second computing device is authorized to communicate with the server based on an identifier of the second computing device transmitted with the request. The computer program product also includes instructions being operable to cause data processing apparatus to assign a unique identifier to the second computing device. The computer program product also includes instructions being operable to cause data processing apparatus to transmit the unique identifier to the second computing device. The computer program product also includes instructions being operable to cause data processing apparatus to receive, a request from the first computing device to direct data to the second computing device. The computer program product also includes instructions being operable to cause data processing apparatus to transmit to the second computing device an indicator that data to be received by the second computing device is the data to be displayed. The computer program product also includes instructions being operable to cause data processing apparatus to receive an end communication indicator from the second computing device. The computer program product also includes instructions being operable to cause data processing apparatus to disconnect from the second computing device such that communication ends between the server and the second computing device.

In yet another aspect, the invention involves a computer-implemented method of displaying data directed from a first computing device to a second computing device. The method involves receiving at a display interface of the second computing device, a request for communication with a server. The method also involves transmitting, from the second computing device, the request for communication with the server to the server. The method also involves receiving, by the second computing device, a unique identifier from the server. The method also involves displaying the unique identifier on the second computing device. The method also involves receiving, by the second computing device, an indicator from the server that data received by the second computing device is the data to be displayed. The method also involves receiving, by the second computing device, the data to be displayed and displaying the data on the second computing device.

In some embodiments, the method involves receiving, by the second computing device, input at the second computing device display indicating that communication between the server and the second computing device should be ended. In some embodiments, the data to be displayed is data the first computing device instructs the server to transmit to the second computing device.

In some embodiments, the method involves transmitting from the second computing device an end communication such that communication ends between the second computing device and the server. In some embodiments, the end communication indicator is transmitted once an input is received on a touch screen display of the second computing device, once a button is pressed on the second computing device, or any combination thereof.

In some embodiments, the first computing device is a tablet device, a desktop computing device, a cell phone device, a smart phone device, or a laptop device. In some embodiments, the second computing device is a tablet device, a desktop computing device, a cell phone device, a smart phone device, or a laptop device. In some embodiments, the second computing device includes a touch screen display.

In some embodiments, the first computing device, the server, and the second computing device communicate via wireless technology. In some embodiments, the data is a document, a web page, a graphic, a form, or any combination thereof. In some embodiments the request from the second computing device to the server includes an IP address of the second computing device.

In yet another aspect, the invention includes a computer program product, tangibly embodied in a non-transitory machine-readable storage device, for directing data from a first computing device to a second computing device for display on the second computing device. The computer program product includes instructions being operable to cause data processing apparatus to receive at a display interface of the second computing device, a request for communication with a server. The computer program product also includes instructions being operable to cause data processing apparatus to transmit the request for communication with the server to the server. The computer program product also includes instructions being operable to receive a unique identifier from the server. The computer program product also includes instructions being operable to display the unique identifier on the second computing device. The computer program product also includes instructions being operable to receive an indicator from the server that data received by the second computing device is the data to be displayed, receive the data to be displayed, and display the data on the second computing device In yet another aspect, the invention involves a computer-implemented method of directing data from a first computing device to a second computing device for display on the second computing device. The method also involves receiving at a display interface of the second computing device, a request for communication with a server. The method also involves transmitting, from the second computing device, the request for communication with the server to the server. The method also involves receiving, by the server, a request from the second computing device to open communication between the server and the second computing device. The method also involves verifying, by the server, that the second computing device is authorized to communicate with the server based on an identifier of the second computing device transmitted with the request. The method also involves assigning, by the server, a unique identifier to the second computing device. The method also involves transmitting, by the server, the unique identifier to the second computing device. The method also involves receiving, by the second computing device, the unique identifier from the server. The method also involves receiving, by the server, a request from the first computing device to direct data to the second computing device. The method also involves transmitting, by the server, to the second computing device an indicator that data to be received by the second computing device is the data to be displayed. The method also involves receiving, by the second computing device, the data to be displayed and displaying the data on the second computing device. The method also involves receiving, by the server, an end communication indicator from the second computing device and disconnecting from the second computing device such that communication ends between the server and the second computing device.

Advantages of the invention include displaying data for viewing and/or acknowledgment to a customer that can be located remotely (or locally) between devices that can communicate wirelessly. Advantages of the invention also include electronically displaying data without the viewer being able to take any actions (e.g., authentication and/or navigation) besides viewing and/or acknowledgment on the display device, thus allowing for a network that the data resides within to be completely isolated from the viewer (e.g., customer). Advantages of the invention also include reducing the transaction time for display and signature capture on the second device (e.g., in cases where additional processing is required, benefiting both the sender and receiver). Advantages of the invention also include reducing any (and in some instances all) handling of paper to produce a document and later deliver the document for further processing.

Advantages of the invention also include that a sender of information does not have to wait for a specific second device, or in the case of a failure of the second device, a different second device may be used. Another advantage of the invention includes the ability to integrate any of a number of web technology solutions that provide the ability to leverage advances in the industry, that will are not limited to the physical abilities of the second device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

Generally, the invention includes a first computing device, a second computing device, and a server. The second computing device registers with the server and receives a unique identifier from the server. The second computing device displays the unique identifier and passively waits for further instructions. Upon receiving an indication from a user of the first computing device that data should be displayed on the second computing device, the server (or a third device) can transmit the data to be displayed to the second computing device.

For example, assuming an agent wants a customer to sign a document. The agent or the customer can instruct a second computing device (e.g., an iPad) to start a program that establishes communication between the server and the iPad. The server transmits to the iPad a unique identifier for display. Once the iPad displays its unique identifier, the agent can select a document on his computer to be displayed on the iPad. Upon selecting the document, the agent inputs the unique identifier of the iPad into his computer. The agent's computer then transmits a message to the server that the document should be displayed on the iPad. The server can transmit the document directly to the iPad. In the case where a third party is responsible for providing the document (e.g., an eSignature vendor), the server can instruct the iPad to expect the document and instruct the third party to transmit the document to the iPad. Once the document arrives at the iPad, the customer can view and/or acknowledge (e.g., by signing) the displayed document on the iPad's touch screen display. It is apparent to one of ordinary skill that the above example is for explanatory purposes only and does not mean to limit the second computing device to an iPad or the data to be displayed and/or acknowledged to a document.

Figure 1:
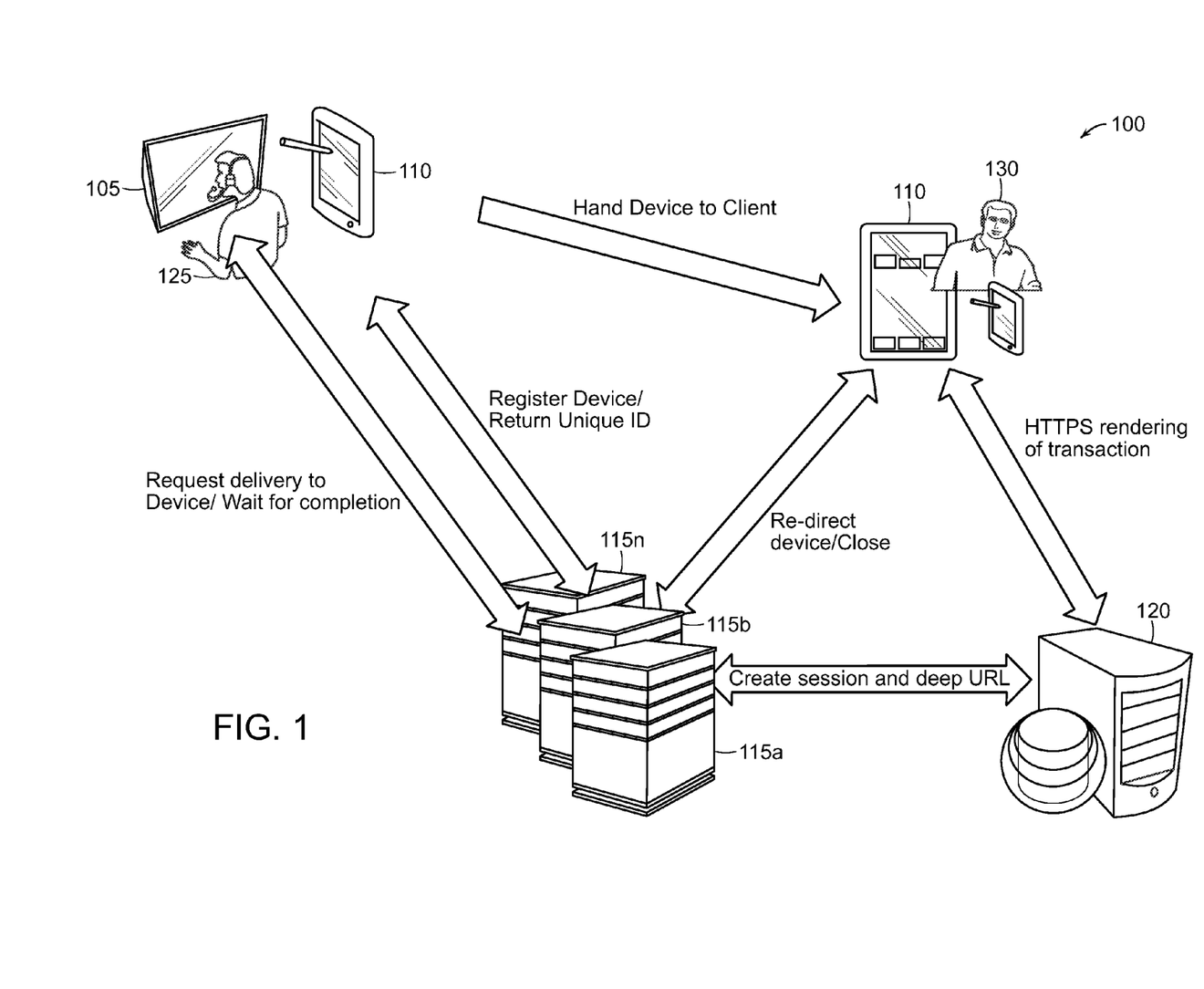
FIG. 1 is a block diagram showing a system for directing data from a first computing device to a second computing device, according to an illustrative embodiment of the invention.

FIG. 1 is a block diagram showing a system 100 for directing data from a first computing device 105 to a second computing device 110, according to an illustrative embodiment of the invention. The system 100 includes a first computing device 105, a second computing device, 110, one or more servers, 115a, 115b, ..., 115n, generally 115, and a third device 120. The first computing device 105 receives inputs from an agent 125 and communicates with the one or more servers 115 via a physical or wireless connection. The second computing device 105 receives commands from the agent 125 and/or the customer 130, communicates with the server 115 via a wireless connection, and communicates with the third device 120. The communication between the first computing device 105 and the second computing device 110 is such that all messages between the two devices to go through the one or more servers 115. Thus, there is no direct communication between the first computing device 105 and the second computing device 110.

During operation, an agent 125 instructs the second computing device 110 (e.g., a tablet) via an application on the second computing device 110 to initiate communication with the one or more servers 115. The one or more servers 115 register the second computing device 110 (e.g., by a registration module within the server 115, not shown), determine a unique identifier, and transmit the unique identifier to the second computing device 110. The second computing device 110 displays the unique identifier continuously until the second computing device 110 receives data to be displayed and/or the unique identifier expires. When the agent 125 wants to display data to a customer 130, the agent 125 provides the second computing device 110 to the customer 130. The agent then inputs the unique identifier into the first computing device 105. The first computing device 105 transmits an indicator (e.g., a message) to the server 115 that the data should be displayed on the second computing device 110. In this embodiment, the server 115 transmits an indicator to the second computing device 110 that the data received should be displayed. The server also transmits a request to the third device 120 (e.g., an eSignature vendor) to transmit the data to be displayed to the second computing device 110. Upon receiving the data, the second computing device 110 displays the data to the customer 130. Once the customer 130 is finished viewing and/or acknowledging the data, an indication signifying the end of communication is transmitted from the second computing device 110 to the server 115. The second computing device 110 ceases to display the data and closes the application. The server 115 then releases the unique identifier, rendering it assignable to other devices using the present invention.

In some embodiments, the end communication indicator is triggered when the customer 130 viewing the document signs the document. In some embodiments, the end communication indicator is triggered when the customer 130 provides input to the second computing device 110 (e.g., depresses a button, taps a touch screen display, or any combination thereof). In some embodiments, the end communication indicator is triggered when the second computing device 110 is powered off. In some embodiments, the end communication indicator is triggered when the time period that the second computing device has been available without receiving data exceeds a predetermined idle duration.

In various embodiments, the first computing device 105 is a tablet device, a desktop computing device, a cell phone device, a smart phone device, or a laptop device. In some embodiments, the second computing device 110 is a tablet device, a desktop computing device, a cell phone device, a smart phone device, or a laptop device. In various embodiments, the first computing device 105 communicates with the one or more servers 115 via wireless communication technology, wired communication technology, or any combination thereof. In some embodiments, the second computing device 110 communicates with the one or more servers 115 via wireless communication technology, wired communication technology, or any combination thereof.

In some embodiments, the data is displayed on the second computing device 110 within a web browser on the second computing device 110. In various embodiments, the data is displayed on the second computing device 110 in a format dictated by the third device 120. It is apparent to one of ordinary skill in the art, that the data can be displayed in any format suitable for the second computing device 110, depending on the second computing device's 110 capabilities.

In some embodiments, the data is a document, a web page, a graphic, a form, or any combination thereof. It is apparent to one of ordinary skill in the art, that the data can be any format that can be displayed on the second computing device 110 depending on the second computing device's 110 capabilities.

Figure 2:
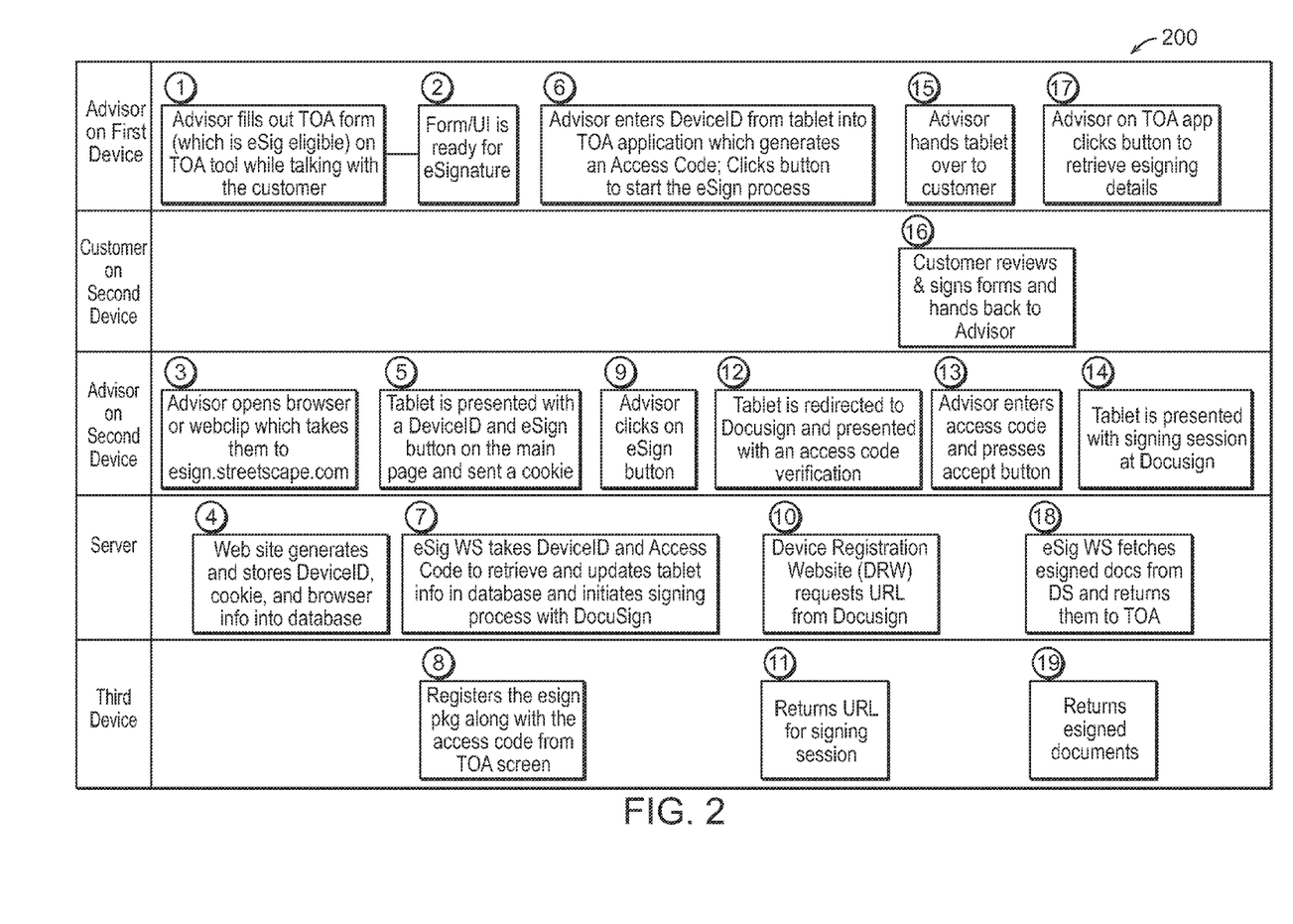
FIG. 2 is a workflow diagram showing a method for directing data from a first computing device to a second computing device, according to an illustrative embodiment of the invention.

FIG. 2 is a workflow diagram 200 showing a method for directing data from a first computing device (e.g., the first computing device 105 as shown above in FIG. 1) to a second computing device (e.g., the second computing device 110 as shown above in FIG. 1), according to an illustrative embodiment of the invention.

The method includes, receiving by the first computing device, a request from a first user (e.g., agent or financial advisor) to select data to be displayed/acknowledged to/by a second user (e.g., a customer or client) (Step 1). In this embodiment, an agent fills out a transfer of assets (TOA) form on a TOA software tool on the first computing device based on information provided by a customer. In some embodiments, the first computing device verifies that the data to be displayed is eligible for remote display and/or acknowledgment. For example, the first computing device verifies that the TOA form is eligible for electronic signature. The verification can be based on local rules that are dictated by the application and/or industry rules based on the type of transaction (e.g., for transferring of assets industry rules can be the Automated Customer Account Transfer (ACAT) Service).

Once the data to be displayed is selected and any required additions to the data are input into the first computing device, the completed data (e.g., the filled in form) is ready to be displayed and/or acknowledged (Step 2).

The method also includes, receiving by the second computing device (e.g., a tablet), a request from the first user to open communication between a server (e.g., server 115 as described above in FIG. 1) and the second computing device (Step 3). In this embodiment, the advisor opens an application on the second computing device, which is a browser or a application that directs the second computing device to a web site associated with the server. The application can automatically deliver embedded data. The request from the second device can include embedded data with the location of the second computing device, a second computing device identifier (e.g., a cookie), a domain of the second computing device, an IP address of the second computing device, and/or an organization identifier (e.g., a client or customer that subscribes to a service that provide the method).

Upon receiving the first message from the second computing device, the server generates a unique identifier (e.g., DeviceID) to transmit to the second computing device (Step 4). The server generates the unique identifier based on the information received from the second computing device. For example, the server can generate the unique identifier based on information found in the request from the application launched on the second device. The server determines whether the second computing device is authorized to receive the unique identifier by comparing the second computing device identifier to a list of authorized second computing devices (e.g., listed by domains) stored on the server (or server memory). In some embodiments, the server maintains a list of second computing devices allowed to receive a unique identifier from the server for each subscriber organization that uses a service implementing the present invention.

In some embodiments, the unique identifier is only unique within the context of a given organization. For example, assume that Company A and Company B subscribe to the service. Assume Company A includes 2 branches (Branch CA1 and Branch CA2), each branch having 1 agent (Agent CAB1A1 and Agent CAB2A1), each agent having their own computer and tablet (Tablet CAB1T1 and Tablet CAB2T1). Assume Company B includes 2 branches (Branch CB1 and Branch CB2), each branch having 1 agent (Agent CBB1A1 and Agent CBB2A1), each agent having their own computer and tablet (Tablet CBB1T1 and Tablet CBB2T1). When Agent CAB1A1 at a first branch of company A activates the application on Tablet CAB1T1, assume a unique identifier #1 is assigned by the server to Tablet CAB1T1 and that when Agent CAB2A1 at a second branch of company A activates the application on Tablet CAB2T1 a unique identifier #2 is assigned to Tablet CAB2T1. When an Agent CBB1A1 at a first branch of company B activates the application on Tablet CBB1T1 the server can assign Tablet CBB1T1 the unique identifier #1 because Tablet CBB1T1 is a tablet that is associated with Company B, not Company A.

In some embodiments, the server maintains one or more tables that are used in determining the unique identifier and storing the unique identifier. For example, in some embodiments, the server maintains one or more tables (e.g., Table 1, Table 2, and/or Table 3 shown below) that stores data related to each second computing device that communicates with the server. Table 1, as shown below, stores a superset of all requests from each second computing device that can communicate with the server.

TABLE 1

| | ESDD_DEV_DEF |
|---|---|
| PK | deviceid |
| PK | sslcertcommonname |
| PK | sslcertissuerdn |
| PK | origsiteinserttime |
| | localsiteinserttime |
| | origsiteid |
| | sslcertserialid |

As shown in table 1, for each request the server can store an identifier of the second computing device (deviceid), a unique id found in the cookie (sslcertcommonmae), an indication that the cookie is being used (sslcertissuerdn or browser cookie (not shown)), original insert time for an entry in (origsiteinserttime), a local insert time for an entry (localsiteinserttime), original site id where the entry was made (origsiteid), and where PK indicates a column in a primary key for the table.

Table 2, as shown below, provides a table stores device registration requests.

TABLE 2

| | ESDCI_DEV_CHCK_IN |
|---|---|
| PK | deviceid |
| PK | lastcheckintime |
| PK | origsiteinserttime |
| | localsiteinserttime |
| | origsiteid |

As shown in Table 2, for each second computing device that requests a unique identifier that has previously requested a unique identifier, the server can store an identifier of the second computing device (deviceid), the last time that the second computing device requested a unique identifier (lastcheckintime), and/or the time that the second computing device requested a unique identifier for the current request (orignsiteinserttime).

In some embodiments, after a time duration has passed over which the second computing device has been available to receive data but has not yet received data, the second computing device's communications with the server can be terminated.

Table 3, as shown below, provides a table of active sessions and the status of each session. Each second computing device that is available to receive data can be logged as shown in Table 3.

TABLE 3

| | ESDE_DEV_ENV |
|---|---|
| PK | deviceid |
| PK | packageid |
| PK | status |
| PK | origsiteinserttime |
| | remainingrecipientnum |
| | totalrecipientnum |
| | localsiteinserttime |
| | origsiteid |
| | appid |

As shown in table 3, for each active second computing device, the server can store an identifier of the second computing device (deviceid), a unique identifier for a particular signing session (packageid), a status of the signing session (status) (e,g., created, complete, or errored), an original insert time for an entry in (origsiteinserttime), number of recipients that have not signed the document (remainingrecipientnum), total number of recipients that need to sign the document (totalrecipientnum), original site id where the entry was made (origsiteid), identifier for a third device (if any) (appid).

It is apparent to one of ordinary skill that the mechanism for determining a unique identifier described above is exemplary only, and that any mechanisms known in the art can be used to determine a unique identifier.

In some embodiments, the server generates a cookie to identify the second device and/or track the second device. In some embodiments, the server generates a certification to identify the second device.

The server transmits the unique identifier to the second computing device. In various embodiments, the server transmits a cookie, a signature button, or any combination thereof to the second computing device.

The second computing device receives the unique identifier and, in some embodiments, the cookie and the signature button (Step 5). The second computing device displays the unique identifier on a display of the second computing device.

Once the unique identifier is displayed on the device, the advisor views the unique identifier and enters the unique identifier into the first computing device, which instructs the first computing device to direct the server to display data on the second computing device (Step 6). In some embodiments, the first computing device can generate and display an access code to the advisor. The access code is an optional form of authentication. In this embodiment, the advisor enters the unique identifier (DeviceID) into the TOA tool (e.g., TOA application) and the TOA application generates an access code. The advisor clicks a button to start the display data process (e.g., a signature process).

The server receives the instructions and unique identifier from the first computing device to display the data on the second computing device, retrieves information regarding the second computing device based on the unique identifier, and instructs the third device to display data on the second computing device (Step 7). In this embodiment, the instructions from the first computing device include the access code. In this embodiment, the data to be displayed is a document for signing, and the server initiates the signing process with third device that includes an electronic signature application (e.g., DocuSign, RightSignature, or EchoSign)

The third device receives and registers the request to display the data on the second computing device (Step 8). In this embodiment, the access code is also transmitted to the third device. The access code can aid in providing an additional authentication challenge for the second device prior to further action occurring.

The third device then transmits the data to be displayed to the second computing device (Steps 9-14). As described above, in this embodiment the data to be displayed is a document for signing. Steps 9-17 describe the process of providing the document to be signed to the second computing device via the electronic signature application DocuSign, and transmitting the signed documents to the first computing device. It will be apparent to one of ordinary skill in the art that Steps 9-17 are only examples of providing a document to be signed and transmitting the document for storage and that other know methods known for transmitting data to the second computing device in the art are contemplated by the invention.

Once the advisor instructs the first computing device to display data on the second computing device, the advisor clicks on an electronic signature button on the second computing device (Step 9). The server requests a URL be transmitted from the third device to the second computing device (Step 10). The third device transmits the URL for the viewing/acknowledgement session to the second computing device (Step 11). In embodiments where the access code was generated by the TOA application, the URL includes the access code. Upon receipt of the URL from the third device, the second computing device is redirected (via the browser or webclip) to the URL, and in some embodiments, an access code verification is transmitted with the redirection (Step 12). In some embodiments, the advisor enters the access code into the second computing device, and presses an accept button (Step 13). The second computing device then presents the data to be displayed (e.g., the document for signing) on a touch screen display of the second computing device (Step 14).

The advisor hands, or otherwise provides, the second computing device to the customer (Step 15). The customer reviews and signs the form via the touch screen display and hands, or otherwise provides, the second computing device back to the advisor (Step 16). The advisor instructs the first computing device to retrieve the signed document by selecting an option on the first computing device and/or following a menu (Step 17). The first computing device transmits the request to the server, and the server obtains the document from the third device (Step 18 and Step 19). The server transmits the document to the first computing device where the agent can store and/or print the document. In some embodiments, once the second computing device ceases displaying the data, a copy of acknowledged data can be automatically emailed to the customer, made available to be used in another computing processes workflow, and/or simply stored.

Figure 3:
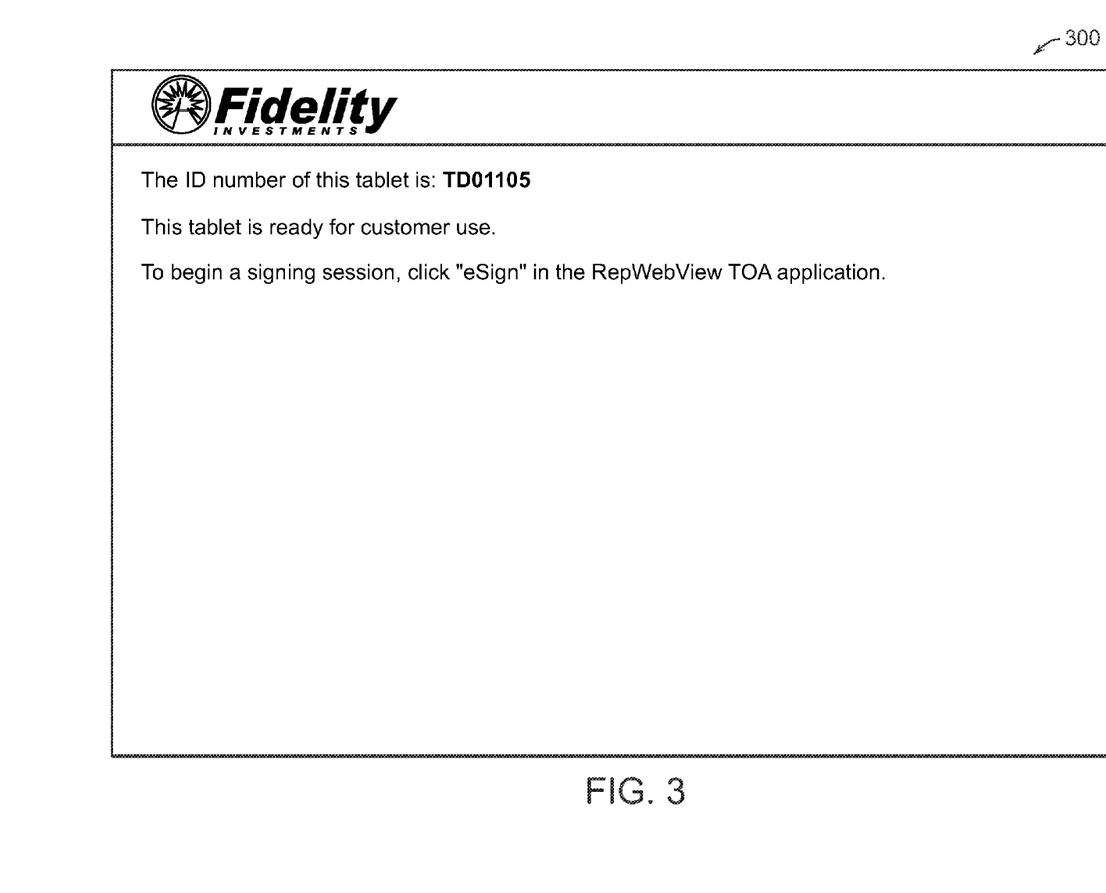
FIG. 3 is an exemplary screen shot of a second computing device displaying a unique identifier, according to an illustrative embodiment of the invention.

FIG. 3 is an exemplary screen shot 300 of a second computing device that is available to receive data for display and/or acknowledgment (e.g., second computing device 110 as described above in FIG. 2) displaying a unique identifier TD01105, according to an illustrative embodiment of the invention.

Figure 4A:
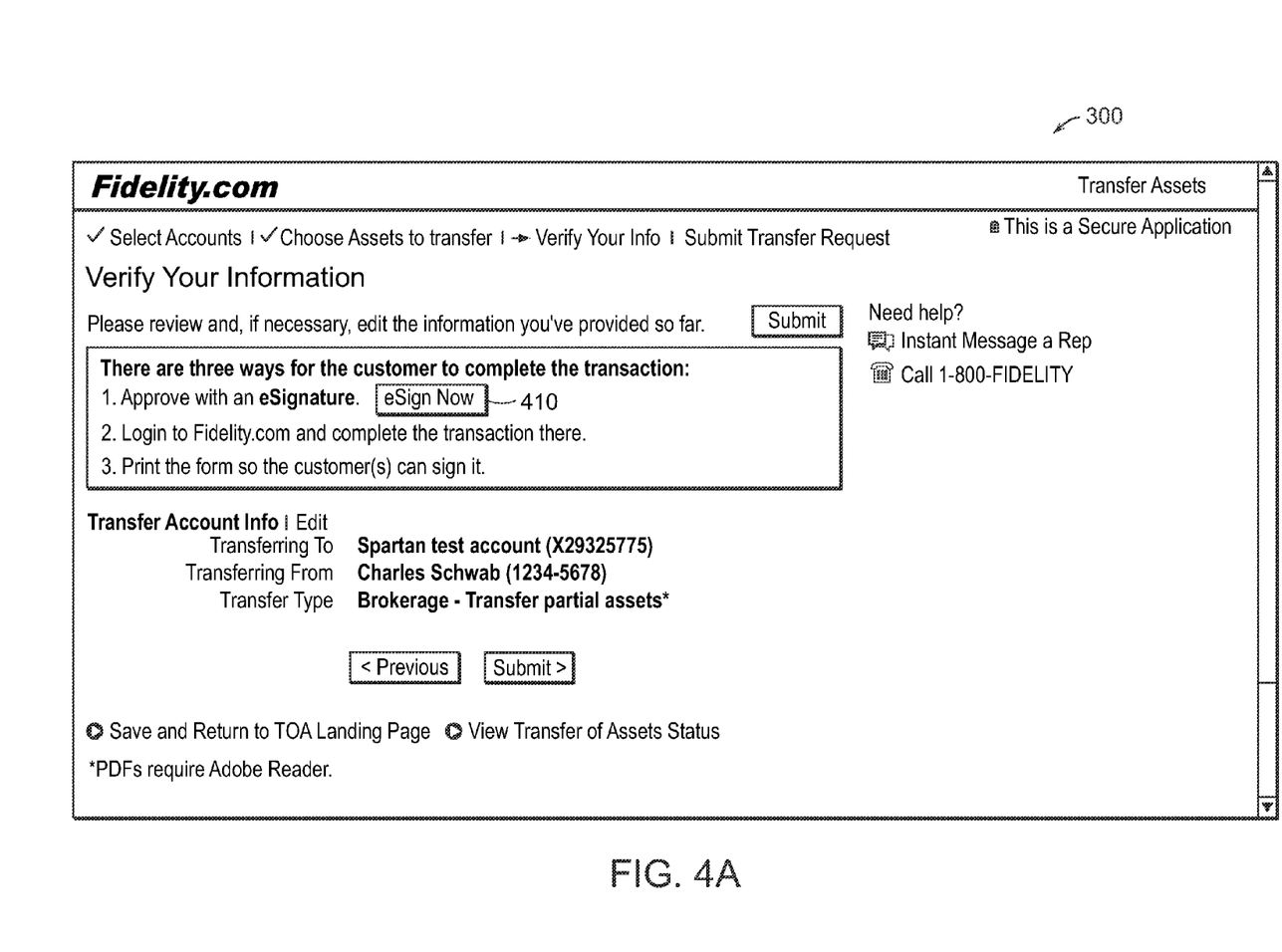
FIGS. 4A-4C are exemplary screen shots of interfaces for a first computing device (to direct data to be displayed on a second computing device, according to illustrative embodiments of the invention.
Figure 4B:
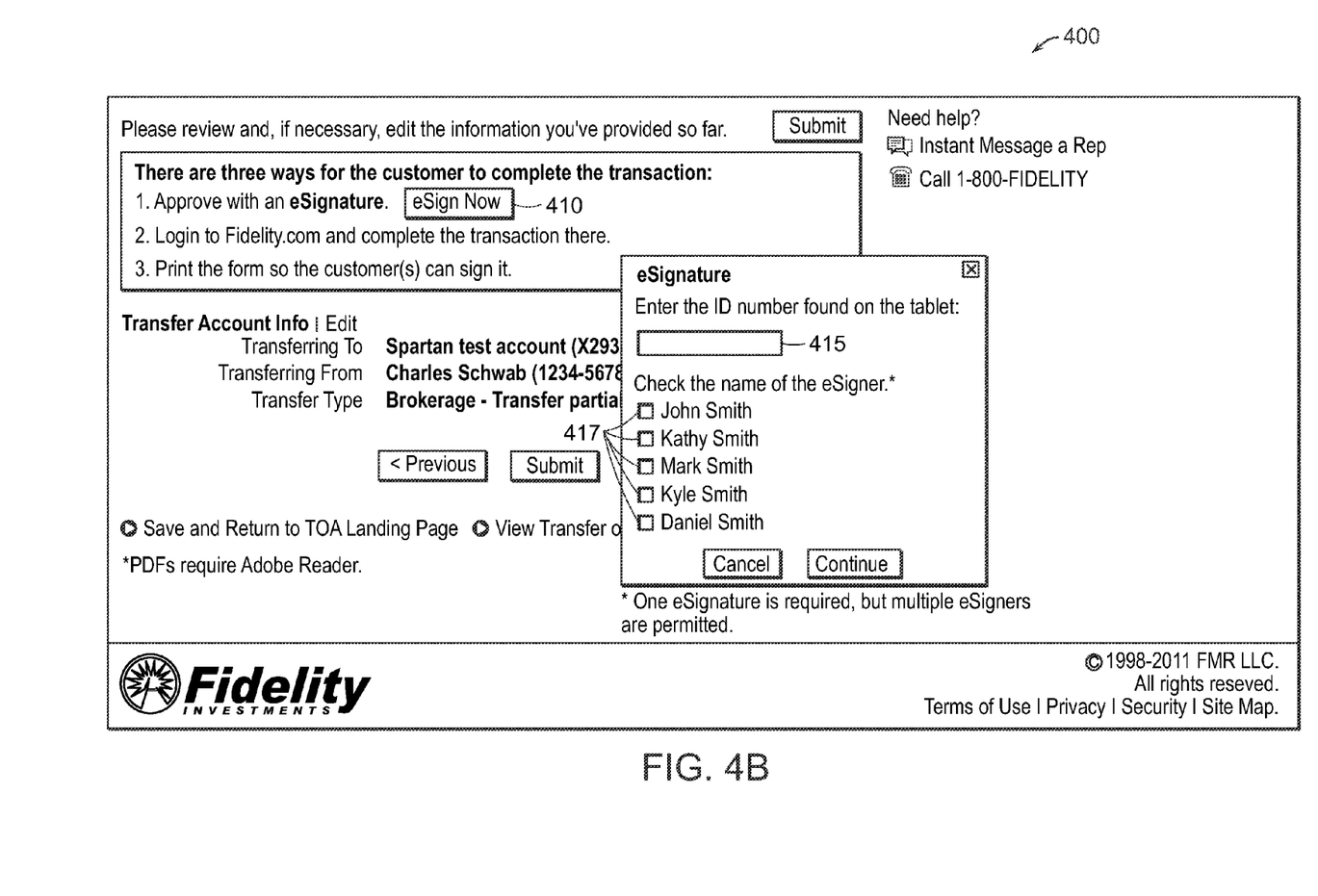
Figure 4C:
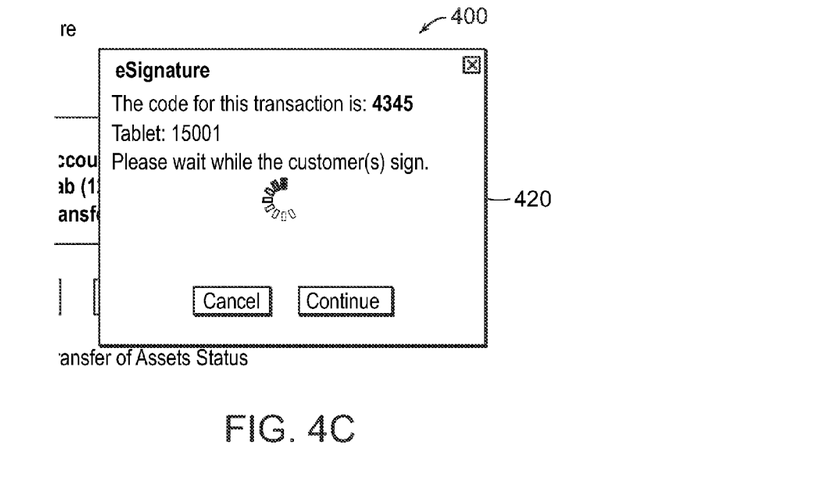

FIG. 4A is an exemplary screen shot of an interface 400 for a first computing device (e.g., first computing device 105 as described above in FIG. 1) to direct data to be displayed on a second computing device (e.g., second computing device 110 as described above in FIG. 1), according to an illustrative embodiment of the invention. An advisor can start the process of displaying data on the second computing device by selecting the eSignNow button 410. FIG. 4B is an exemplary screen shot of the interface 400 once the advisor has selected the eSignNow button 410, according to an illustrative embodiment of the invention. The advisor is prompted to input the unique identifier (e.g., unique identifier TD01105 as shown above in FIG. 3) into area 415. In some embodiments, where the data to be displayed is to be acknowledged by a signature, the advisor can select the name of the person(s) to sign the data by checking one or more of the checkboxes 417. FIG. 4C is an exemplary screen shot of the interface 400 once the unique identifier has been input, according to an illustrative embodiment of the invention. Display area 420 is presented to the user indicating that a customer should view/acknowledge the data on the second computing device.

Figure 5:
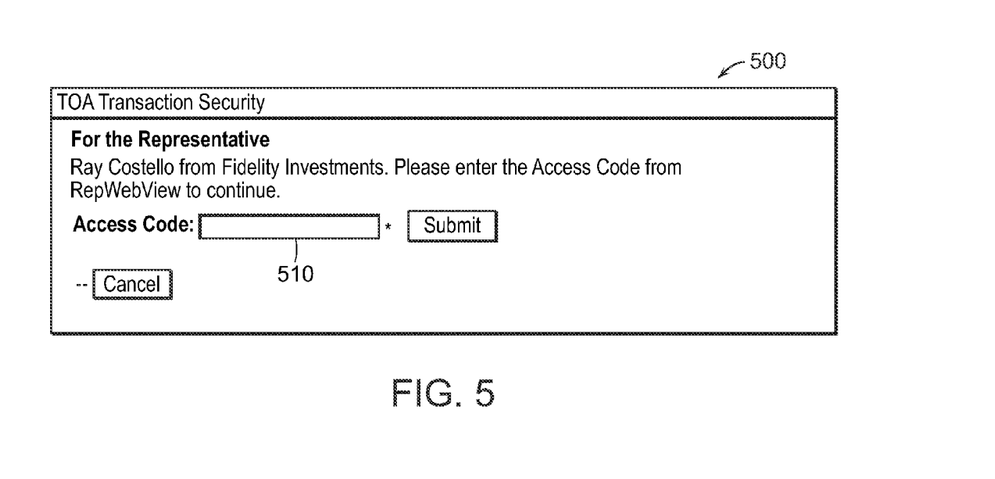
FIG. 5 is an exemplary screen shot of an interface displayed on the second computing device for requesting input of an access code, according to an illustrative embodiment of the invention.

In embodiments where an access code is generated (e.g., Step 6 as shown above in FIG. 2), an advisor can be required to input the access code prior to the data being displayed on the second computing device. FIG. 5 is an exemplary screen shot of an interface 500 displayed on the second computing device for entering the generated access code (e.g., the access code generated by the server and displayed, as shown in FIG. 4C above). The access code can be input into area 510.

Figure 6A:
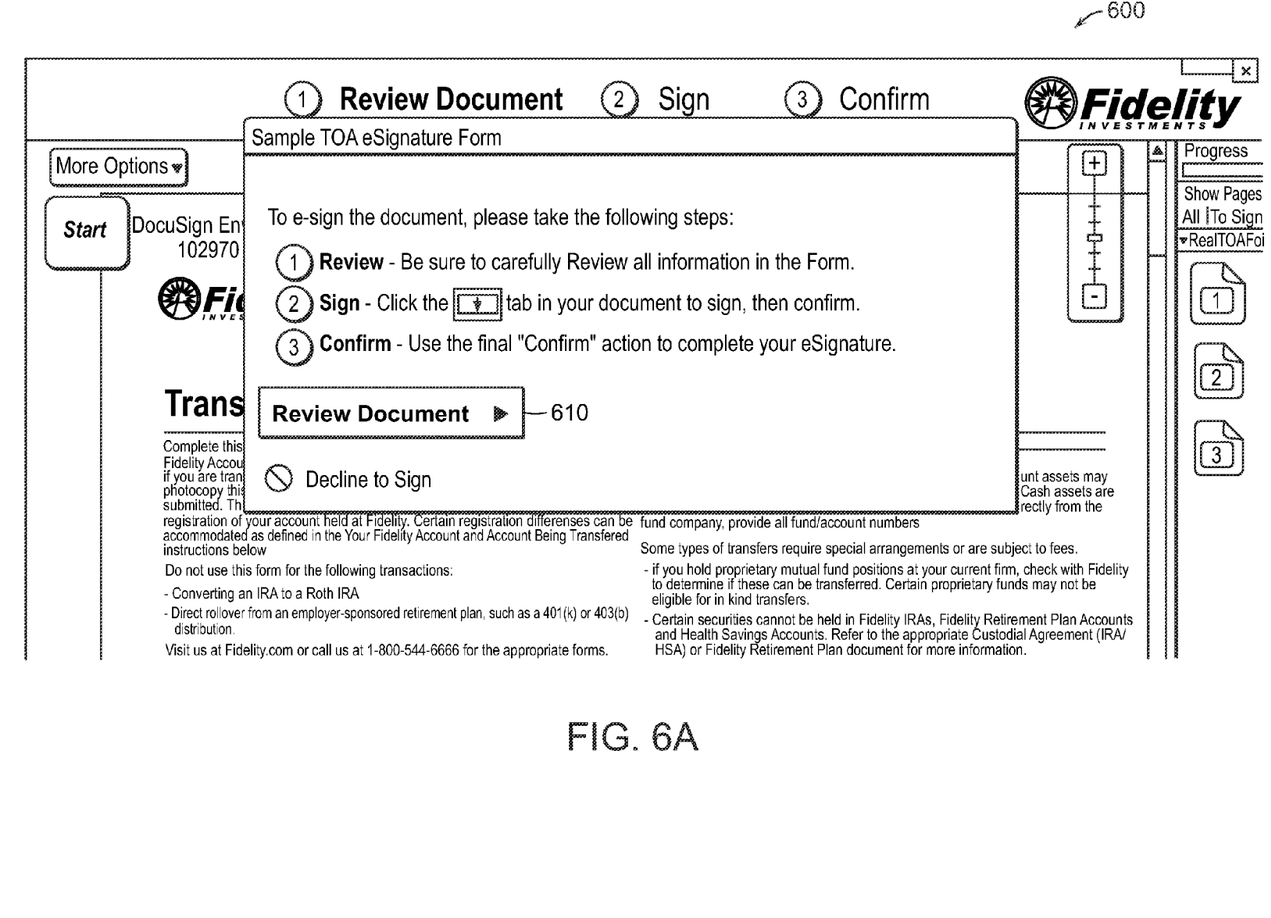
FIGS. 6A-6D are exemplary screen shots of data to be displayed on a second computing device, according to illustrative embodiments of the invention.
Figure 6B:
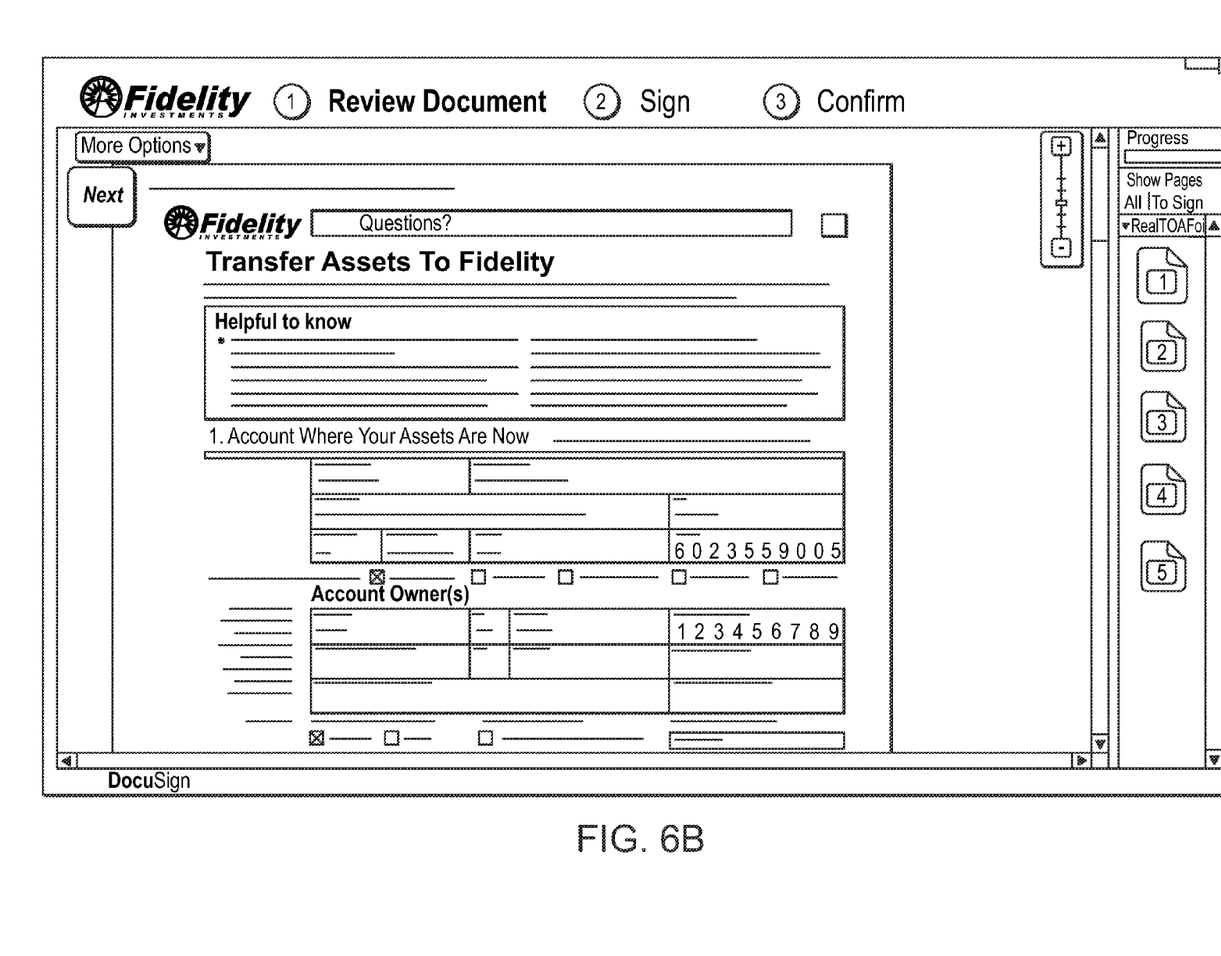
Figure 6C:
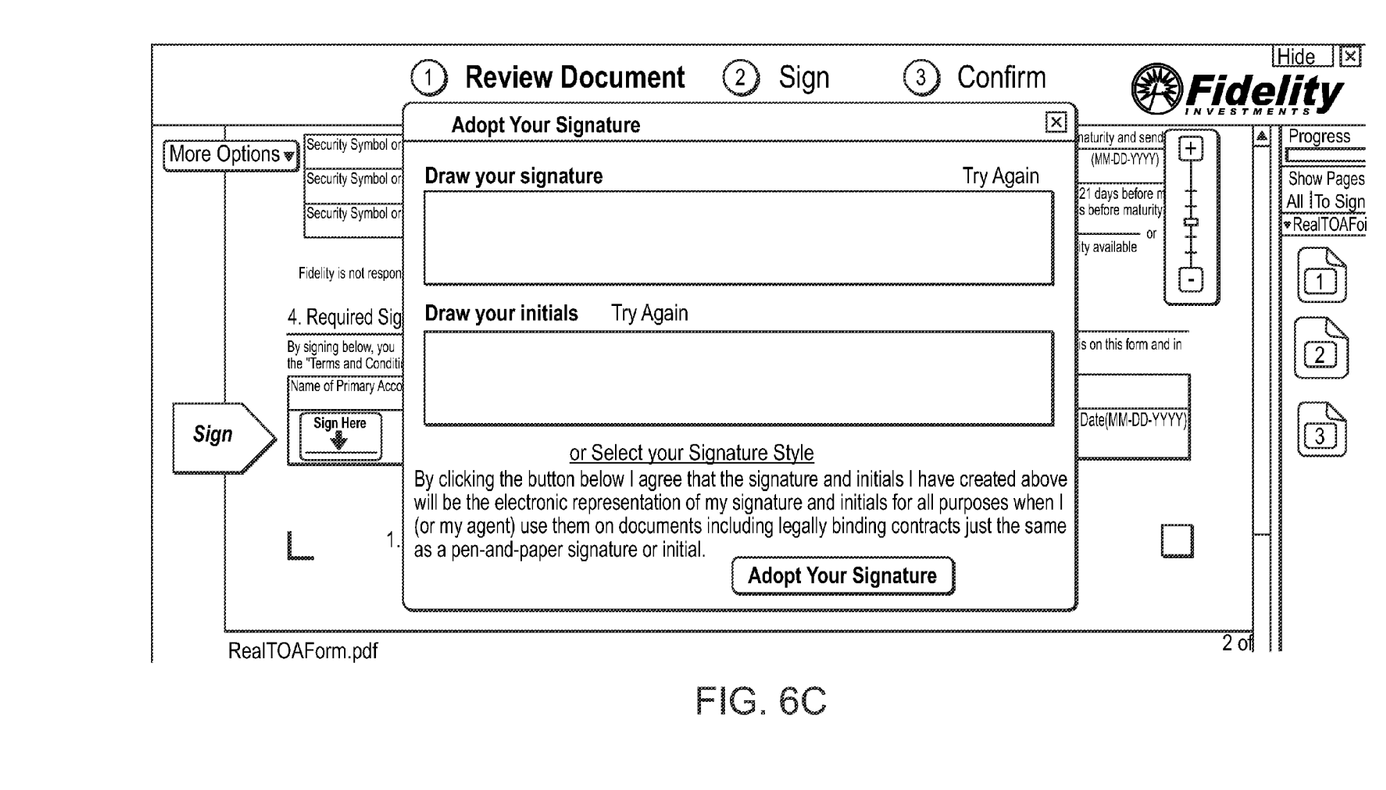
Figure 6D:
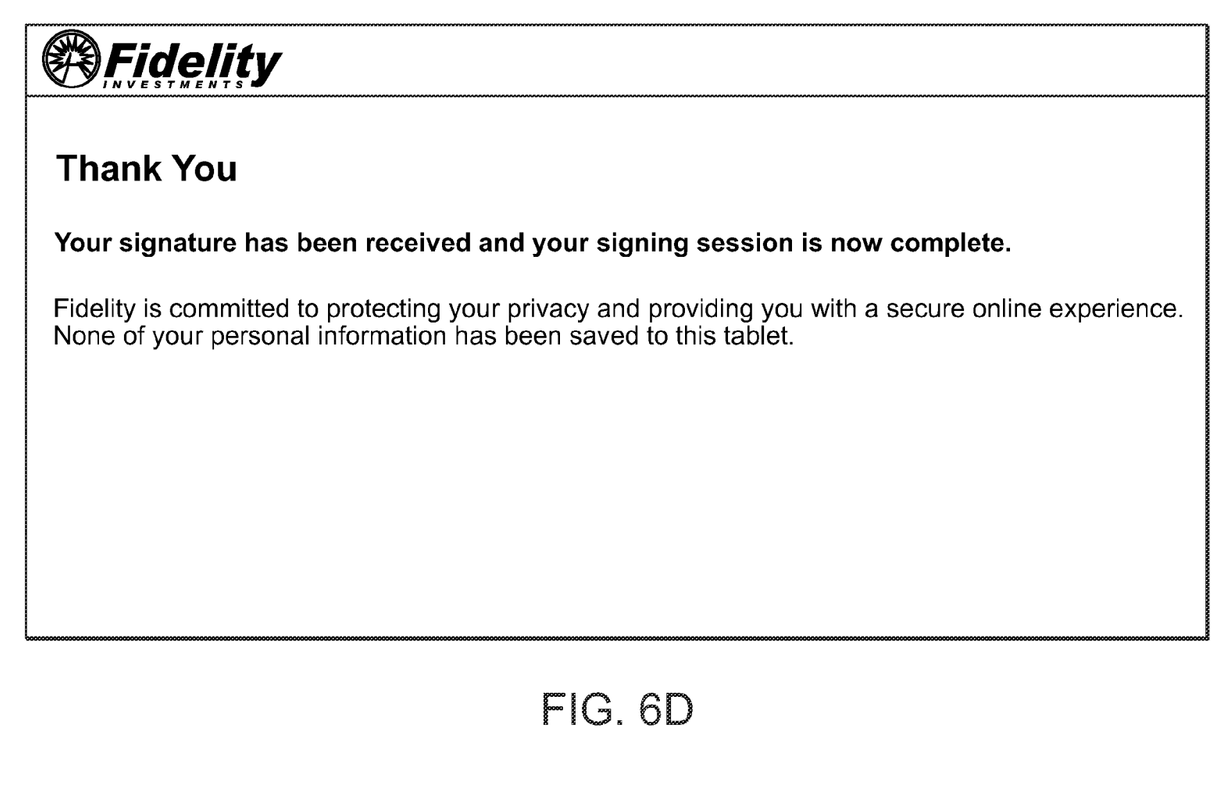

FIG. 6A is an exemplary screen shot 600 of the data to be displayed on the second computing device (e.g., as described above in FIG. 2, step 16). In this embodiment, the data to be displayed is a document and associated web pages that are transmitted to the second computing device via an electronic signature vendor. Once the viewer selects the review document button 610, the document is presented to the viewer for review and signature on a touch screen display of the second computing device, as shown in FIG. 6B and FIG. 6C. Once the signature is received by the second computing device, the second computing device can display and indicator that the session has ended, as shown in FIG. 6D.

The above-described systems and methods can be implemented in digital electronic circuitry, in computer hardware, firmware, and/or software. The implementation can be as a computer program product (e.g., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, tablet) with a world wide web browser (e.g., Microsoft®Internet Explorer®available from Microsoft Corporation, Chrome available from Google, Mozilla®Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft®Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method of directing data from a first computing device to a second computing device for display on the second computing device, the method comprising:

receiving, by a server, a request to register a second computing device for a temporary unique identifier for use in electronically signing documents;

verifying, by the server, that the second computing device is authorized to electronically sign the documents;

assigning, by the server, a unique identifier to the second computing device, if authorized;

transmitting, by the server, the unique identifier to the second computing device;

receiving, by the server, a request from the first computing device to direct a document selected to be electronically signed to the second computing device, the request including the unique identifier assigned to the second computing device;

transmitting, by the server, to the second computing device an indicator to display the selected document;

receiving, by the server, an end communication indicator from the second computing device triggered by the selected document being electronically signed;

disconnecting from the second computing device such that communication ends between the server and the second computing device; and releasing, by the server, assignment of the unique identifier to the second computing device.

2. The method of claim 1 wherein the unique identifier is based on the location the request was transmitted from, a customer the request was transmitted from, unique identifiers previously assigned to other devices by the server, or any combination thereof.

3. The method of claim 1 further comprising disconnecting, by the server, from the second computing device if the time between opening communication with the second computing device and receiving a request from the first computing device exceeds a predetermined threshold.

4. The method of claim 1 further comprising transmitting, by the server, a request to a third device to transmit the selected document to be electronically signed to the second computing device.

5. The method of claim 1 further comprising transmitting, by the server, the selected document to be electronically signed to the second computing device.

6. The method of claim 1 wherein the first computing device or the second computing device is a tablet device, a desktop computing device, a cell phone device, a smart phone device, or a laptop device or includes a touch screen display.

7. The method of claim 1 wherein the end communication indicator is transmitted once an input is received on a touch screen display of the second computing device, once a button is pressed on the second computing device, or any combination thereof.

8. The method of claim 1 wherein the first computing device, the server, and the second computing device communicate via wireless technology.

9. The method of claim 1 wherein the data is a document, a web page, a graphic, a form, or any combination thereof.

10. The method of claim 1 wherein the request from the second computing device includes an IP address of the second computing device.

11. A computer-implemented method of directing data from a first computing device to a second computing device for display on the second computing device, the method comprising:
   receiving, by the server, a request to register the second computing device for a temporary unique identifier for use in electronically signing documents;
   verifying, by the server, that the second computing device is authorized to electronically sign the documents;
   assigning, by the server, the unique identifier to the second computing device, if authorized;
   transmitting, by the server, the unique identifier to the second computing device;
   displaying, by the second computing device, the unique identifier assigned to the second computing device by the server;
   receiving, by the first computing device, manual input comprising the unique identifier displayed on the second computing device;
   receiving, by the server, a request from the first computing device to direct a document selected to be electronically signed to the second computing device, the request including the unique identifier assigned to the second computing device;
   transmitting, by the server, to the second computing device an indicator to display the selected document;
   receiving, by the second computing device, the selected document to be displayed;
   displaying, by the second computing device, the selected document on the second computing device;
   receiving, by the server, an end communication indicator from the second computing device triggered by the selected document being electronically signed;
   disconnecting from the second computing device such that communication ends between the server and the second computing device; and
   releasing, by the server, assignment of the unique identifier to the second computing device.

\* \* \* \* \*